(12) United States Patent
Kaneko et al.

(10) Patent No.: US 8,256,965 B2
(45) Date of Patent: Sep. 4, 2012

(54) THRUST SLIDING BEARING AND COMBINATION MECHANISM OF THE THRUST SLIDING BEARING AND A PISTON ROD

(75) Inventors: Ryohei Kaneko, Kanagawa (JP); Atsushi Yoshida, Kanagawa (JP)

(73) Assignee: Oiles Corporation, Tokyo (JP)

( * ) Notice: Subject to any disclaimer, the term of this patent is extended or adjusted under 35 U.S.C. 154(b) by 474 days.

(21) Appl. No.: 12/527,586

(22) PCT Filed: Feb. 19, 2008

(86) PCT No.: PCT/JP2008/000257
§ 371 (c)(1),
(2), (4) Date: Aug. 18, 2009

(87) PCT Pub. No.: WO2008/102541
PCT Pub. Date: Aug. 28, 2008

(65) Prior Publication Data
US 2010/0008610 A1 Jan. 14, 2010

(30) Foreign Application Priority Data
Feb. 20, 2007 (JP) .................................. 2007-040050

(51) Int. Cl.
*F16C 17/04* (2006.01)
(52) U.S. Cl. ....................................................... 384/420
(58) Field of Classification Search .......... 384/420–427, 384/125; 280/124.146, 124.147, 124.155; 267/220
See application file for complete search history.

(56) References Cited

U.S. PATENT DOCUMENTS

| | | | |
|---|---|---|---|
| 4,907,289 A * | 3/1990 | Kamimura et al. | 384/420 |
| 6,290,218 B1 * | 9/2001 | Mayerbock | 280/124.155 |
| 7,017,892 B2 * | 3/2006 | Hurrlein et al. | 280/124.155 |
| 2007/0009190 A1 * | 1/2007 | Yano | 384/420 |
| 2007/0116391 A1 * | 5/2007 | Watai et al. | 384/420 |

FOREIGN PATENT DOCUMENTS

| | | |
|---|---|---|
| EP | 1 365 162 A1 | 11/2003 |
| EP | 1 607 645 A1 | 12/2005 |
| GB | 2 201 383 A | 9/1988 |
| JP | 2004-176728 | 6/2004 |

(Continued)

OTHER PUBLICATIONS

International Search Report for PCT/JP2008/000257 mailed Mar. 25, 2008.

(Continued)

*Primary Examiner* — Thomas R Hannon
(74) *Attorney, Agent, or Firm* — Nixon & Vanderhye P.C.

(57) ABSTRACT

A thrust sliding bearing 1 includes a synthetic resin-made bearing body 4 having an annular upper surface 2 and an annular outer peripheral surface 3; a synthetic resin-made bearing body 6 which is superposed on the bearing body 4 so as to be relatively rotatable; a synthetic resin-made thrust sliding bearing piece 7 interposed between the annular upper surface 2 of the bearing body 4 and an annular lower surface 5 of the bearing body 6; an annular upper cover 10 having an annular engaging inner peripheral surface 9 which engages an annular engaging outer peripheral surface 8 of the bearing body 4; and an annular metal plate 15 interposed between an annular upper surface 11 of the bearing body 6 and a lower surface 14 of the annular upper cover 10.

4 Claims, 4 Drawing Sheets

FOREIGN PATENT DOCUMENTS

JP    2004-263773    9/2004

OTHER PUBLICATIONS

Microfilm of the specification and drawings annexed to the request of Japanese Utility Model Application No. 196804/1986 (Laid-open No. 101326/1998).

Microfilm of the specification and drawings annexed to the request of Japanese Utility Model Application No. 116780/1980 (Laid-open No. 40749/1982).

Extended European Search Report in EP 08 71 0411 dated Apr. 11, 2011.

* cited by examiner

THRUST SLIDING BEARING AND COMBINATION MECHANISM OF THE THRUST SLIDING BEARING AND A PISTON ROD

This application is the U.S. national phase of International Application No. PCT/JP2008/1000257 filed 19 Feb. 2008 which designated the U.S. and claims priority to Japanese Patent Application No. 2007-040050 filed 20 Feb. 2007, the entire contents of each of which are hereby incorporated by reference.

TECHNICAL FIELD

The present invention relates to a thrust sliding bearing, and more particularly to a thrust sliding bearing which is suitably incorporated as a sliding bearing of a strut-type suspension (Macpherson type) in a four-wheeled vehicle, as well as a combination mechanism of the thrust sliding bearing and a piston rod.

BACKGROUND ART

[Patent Document 1] JP-A-8-326758
[Patent Document 2] JP-A-2004-263773
[Patent Document 3] JP-A-2004-225754

A strut-type suspension used for a front wheel of a four-wheeled vehicle generally has a structure in which a strut assembly incorporating a hydraulic shock absorber in an outer cylinder integrated with a main shaft is combined with a coil spring. Among such suspensions, there is a type in which when the strut assembly rotates together with the coil spring in the steering operation, the piston rod of the strut assembly rotates, and a type in which the piston rod does not rotate. In either type, there are cases where, instead of a rolling bearing, a synthetic resin-made thrust sliding bearing is used between a mechanism for mounting the strut assembly to the vehicle body and an upper spring seat member of the coil spring, so as to allow smooth rotation of the strut assembly.

DISCLOSURE OF THE INVENTION

Problems that the Invention is to Solve

Incidentally, in the mechanism for mounting the strut assembly to the vehicle body, a mounting plate is used for supporting one end of the piston rod of the hydraulic shock absorber, but in the case of such a mounting mechanism, the mounting plate for supporting the end of the piston rod is not only required, but the structure becomes complex, so that high cost is entailed.

The present invention has been devised in view of the above-described aspects, and its object is to provide a thrust sliding bearing which is capable of supporting an end of the piston rod in replacement of the mounting plate of the mechanism for mounting the strut assembly to the vehicle body and hence capable of simplifying the mounting mechanism and of reducing the cost, as well as a combination mechanism of the thrust sliding bearing and a piston rod.

Means for Solving the Problems

A thrust sliding bearing in accordance with the present invention comprises: a synthetic resin-made annular first bearing body having an annular upper surface and an annular engaging outer peripheral surface; a synthetic resin-made annular second bearing body which is superposed on the first bearing body so as to be relatively rotatable about an axis of the first bearing body and has an annular lower surface opposed to the annular upper surface of the first bearing body; thrust sliding bearing means interposed between the annular upper surface of the first bearing body and the annular lower surface of the second bearing body and having at least on of a lower surface and an upper surface which is in slidable contact with at least one of the annular upper surface of the first bearing body and the annular lower surface of the second bearing body; an annular upper cover having an annular engaging inner peripheral surface engaging the annular engaging outer peripheral surface of the first bearing body; and an annular metal plate interposed between an annular upper surface of the second bearing body and a lower surface of the annular upper cover such that a lower surface of the annular metal plate is brought into contact with the annular upper surface of the second bearing body and an upper surface thereof is brought into contact with the lower surface of the annular upper cover, wherein the annular metal plate is provided with an annular inner peripheral surface having a smaller diameter than inside diameters of annular inner peripheral surfaces of the first and second bearing bodies and the annular upper cover.

According to the thrust sliding bearing in accordance with the invention, the annular metal plate, which is provided with the annular inner peripheral surface having a smaller diameter than diameters of the annular inner peripheral surfaces of the first and second bearing bodies and the annular upper cover, is interposed between the annular upper surface of the second bearing body and the lower surface of the annular upper cover such that the lower surface of the annular metal plate is brought into contact with the annular upper surface of the second bearing body and the upper surface thereof is brought into contact with the lower surface of the annular upper cover. Therefore, one end of the piston rod can be supported by such an annular metal plate, and it is possible to eliminate the mounting plate for supporting the end of the piston rod in the mechanism for mounting the strut assembly to the vehicle body, thereby making it possible to simplify the mounting mechanism and attain cost reduction.

In a preferred example, the annular upper cover has the annular inner peripheral surface with which an annular outer peripheral surface of the annular metal plate is brought into contact. In such an example, the annular metal plate can be positioned with respect to the annular upper cover, with the result that it is unnecessary to fix the annular metal plate to the second bearing body and the annular upper cover by using an adhesive or the like. The fixation of the annular metal plate to the second bearing body and the annular upper cover may be effected by using an adhesive or the like in some cases, but may be effected by the fitting of a projection and a through hole or a recess in substitution thereof or in conjunction therewith. Each of the projection and the through hole or the recess may be singular, but may preferably be plural.

In the invention, the thrust sliding bearing means may have a synthetic resin-made thrust sliding bearing piece which is separate from the first bearing body and the second bearing body, or may have in substitution thereof a synthetic resin-made thrust sliding bearing piece formed integrally with at least one of the first bearing body and the second bearing body.

The both bearing bodies may be formed of a synthetic resin including at least one of polyacetal resin, polyamide resin, thermoplastic polyester resin, polyolefin resin, polycarbonate resin, and fluororesin. In the case where the thrust sliding bearing means is embodied by the thrust sliding bearing piece, such a thrust sliding bearing piece may be formed of a synthetic resin including at least one of polyacetal resin, polyamide resin, thermoplastic polyester resin, polyolefin resin, and fluororesin. As for each of the first and second bearing bodies, a synthetic resin similar to the synthetic resin constituting the thrust sliding bearing piece can be used, but particularly a synthetic resin which exhibits satisfactory friction characteristics when combined with the synthetic resin used for the thrust sliding bearing piece is used. To illustrate examples of desirable combinations thereof, it is possible to cite the following combinations for the thrust sliding bearing piece and the first and second bearing bodies: a combination of polyacetal resin and polyamide resin; a combination of a polyolefin resin, particularly polyethylene resin, and polyacetal resin; a combination of polyacetal resin and a thermoplastic polyester resin, particularly polybutylene terephthalate resin; and a combination of polyacetal resin and polyacetal resin.

The annular upper cover in a preferred example is formed of a thermoplastic synthetic resin such as polyacetal resin, polyamide resin, and polybutylene terephthalate resin, but may be formed of a reinforced thermoplastic synthetic resin in which such a thermoplastic synthetic resin is reinforced by an inorganic filler such as glass fiber, glass powder, glass beads, carbon fiber, and the like. The annular metal plate in a preferred example is formed of a steel plate made of such as steel, stainless steel, or the like, but may alternatively be formed of a nonferrous alloy plate made of such as a copper alloy, a titanium alloy, or the like.

A combination mechanism of a thrust sliding bearing and a piston rod in accordance with the invention, or a combination mechanism for use in a strut-type suspension in a four-wheeled vehicle in a preferred example, comprises: the thrust sliding bearing according to any one of the above-described aspects; and a piston rod of a shock absorber. Here, the piston rod includes a large-diameter portion disposed in a through hole defined by the annular inner peripheral surfaces of the first and second bearing bodies; a small-diameter portion whose diameter is smaller than the large-diameter portion and which is formed integrally with the large-diameter portion and is disposed in a through hole defined by the inner peripheral surface of the annular metal plate; and a threaded portion formed on the small-diameter portion. Here, the annular metal plate is clamped between an annular recessed stepped surface between the large-diameter portion and the small-diameter portion of the piston rod and an annular surface of a nut threadedly engaged with the threaded portion.

Advantages of the Invention

According to the invention, it is possible to provide a thrust sliding bearing which is capable of supporting an end of the piston rod through the incorporated annular metal plate in replacement of the mounting plate of the mechanism for mounting the strut assembly to the vehicle body and hence capable of simplifying the mounting mechanism and of reducing the cost, as well as a combination mechanism of the thrust sliding bearing and a piston rod.

Hereafter, a more detailed description will be given of the mode for carrying out the invention on the basis of preferred embodiments illustrated in the drawings. It should be noted that the present invention is not limited to these embodiments.

BEST MODE FOR CARRYING OUT THE INVENTION

Figure 1:
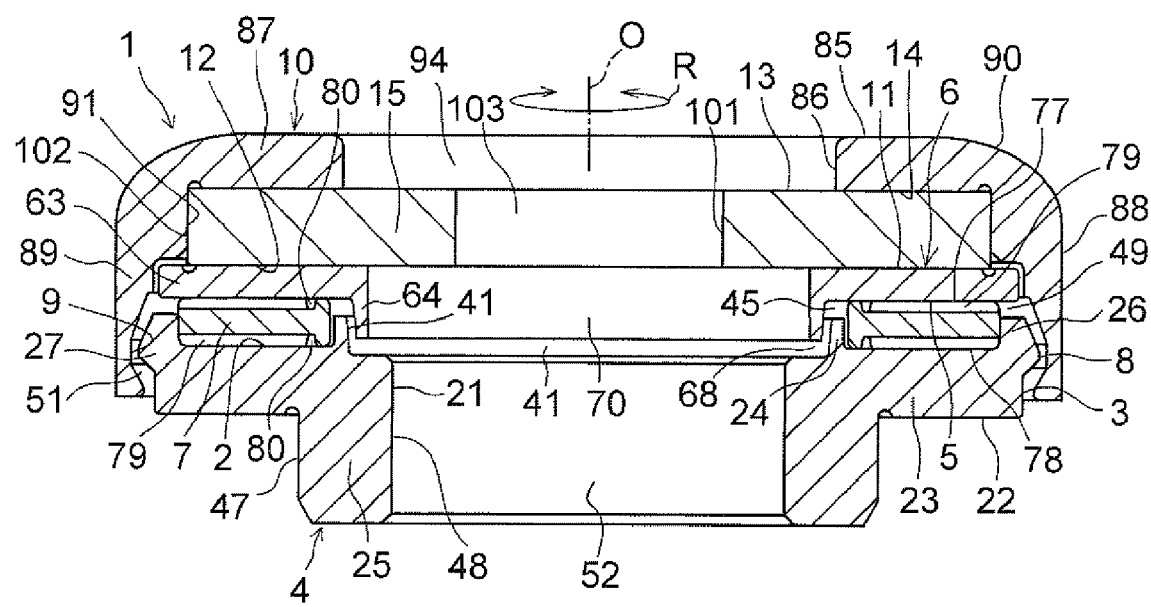
FIG. 1 is a cross-sectional view of an embodiment of the invention.
Figure 2:
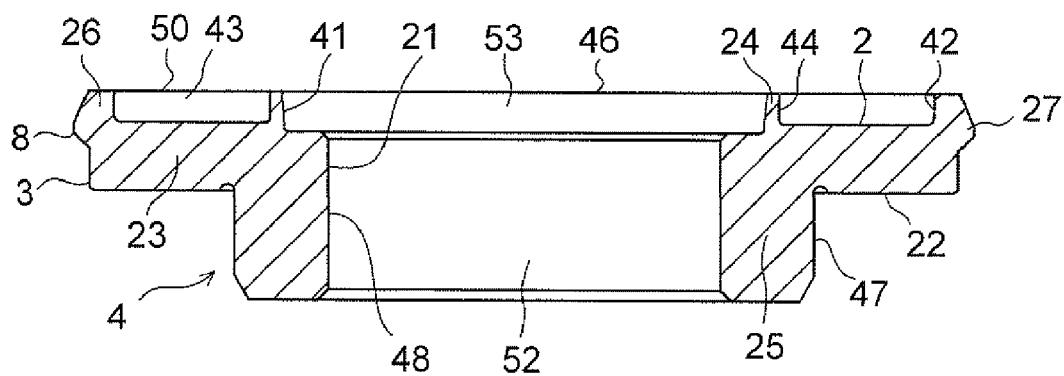
FIG. 2 is a cross-sectional view of a bearing body in the embodiment shown in FIG. 1.
Figure 3:
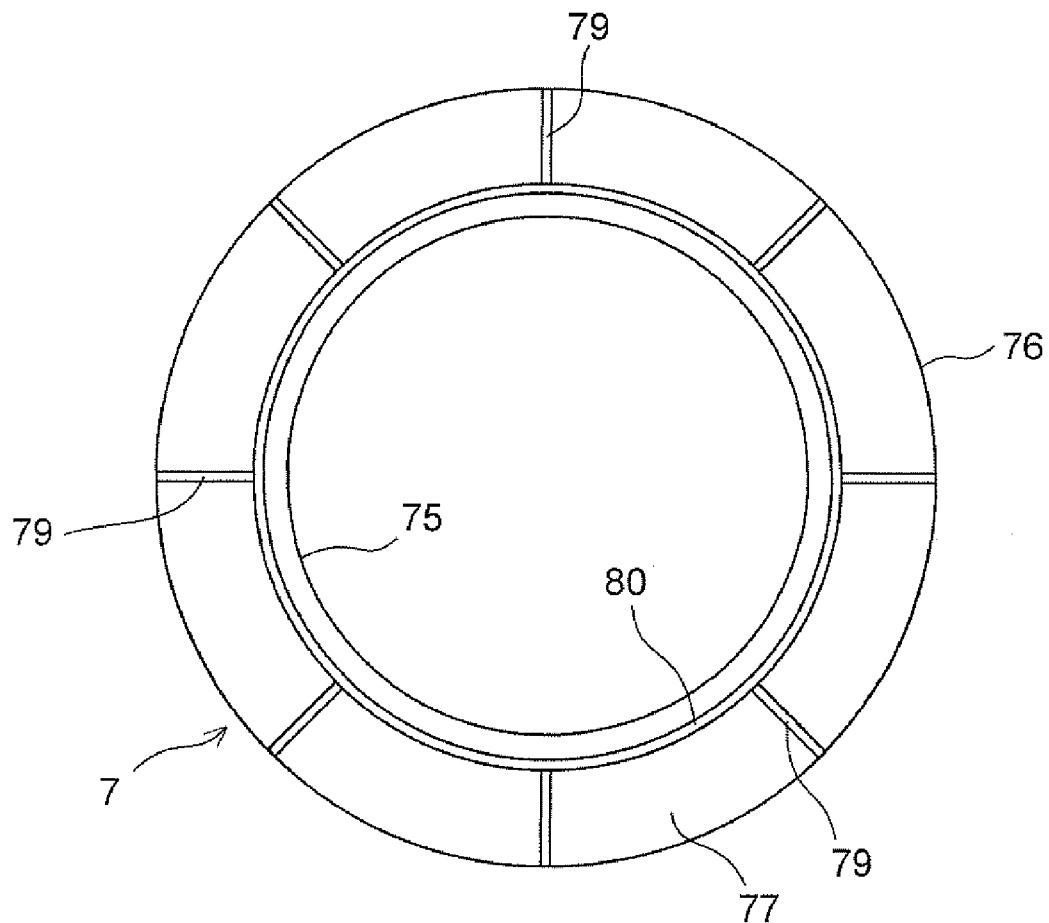
FIG. 3 is a plan view of a thrust sliding bearing piece in the embodiment shown in FIG. 1.
Figure 4:
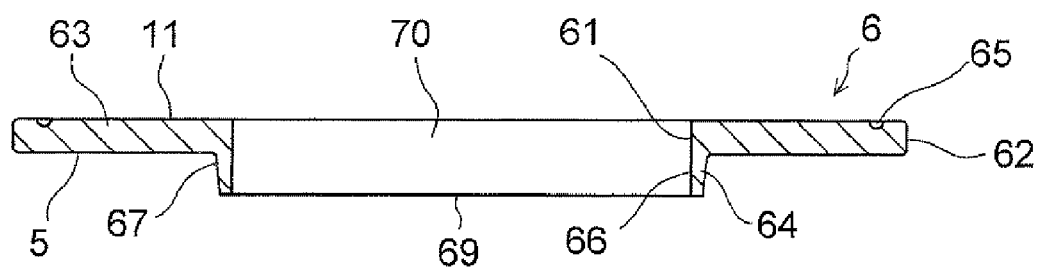
FIG. 4 is a cross-sectional view of the bearing body in the embodiment shown in FIG. 1.
Figure 5:
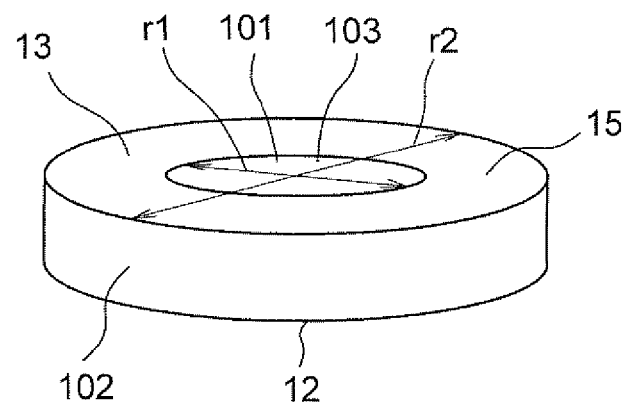
FIG. 5 is a perspective view of an annular metal plate in the embodiment shown in FIG. 1.
Figure 6:
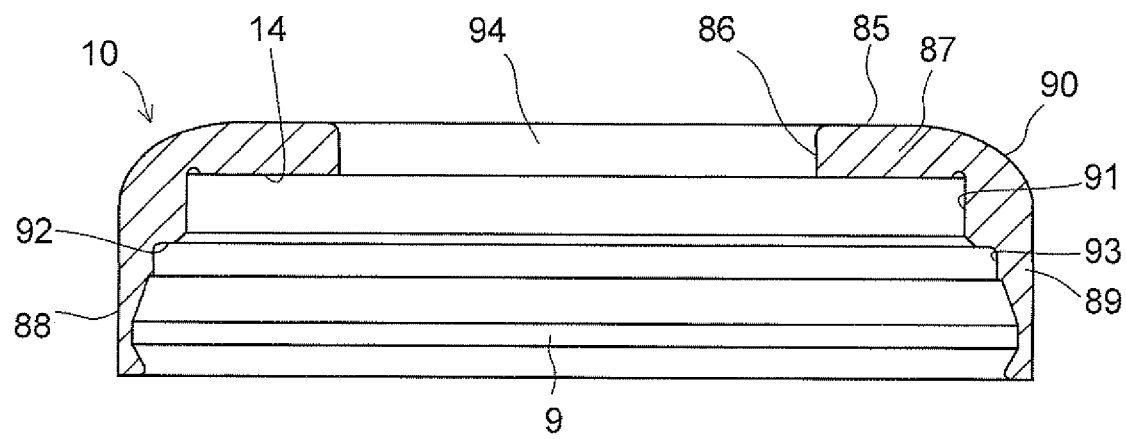
FIG. 6 is a cross-sectional view of an annular upper cover in the embodiment shown in FIG. 1.

In FIGS. 1 to 6, a thrust sliding bearing 1 of this embodiment includes a synthetic resin-made annular bearing body 4 having an annular upper surface 2 and an annular outer peripheral surface 3; a synthetic resin-made annular bearing body 6 which is superposed on the bearing body 4 so as to be relatively rotatable about an axis O of the bearing body 4 in an R direction and has an annular lower surface 5 opposed to the annular upper surface 2 of the bearing body 4; an annular synthetic resin-made thrust sliding bearing piece 7 which serves as a thrust sliding bearing means interposed between the annular upper surface 2 of the bearing body 4 and the annular lower surface 5 of the bearing body 6, and which is formed separately from the bearing body 4 and the bearing body 6; an annular upper cover 10 having an annular engaging inner peripheral surface 9 which engages an annular engaging outer peripheral surface 8 of the bearing body 4; and an annular metal plate 15 interposed between an annular upper surface 11 of the bearing body 6 and a lower surface 14 of the annular upper cover 10 such that its lower surface 12 is brought into contact with the annular upper surface 11 of the bearing body 6 and its upper surface 13 is brought into contact with the lower surface 14 of the annular upper cover 10.

The bearing body 4 includes an annular lower bearing main body 23 having the annular upper surface 2, the annular outer peripheral surface 3, an annular inner peripheral surface 21, and an annular lower surface 22; an annular inner projecting portion 24 formed integrally with the annular upper surface 2 of the lower bearing main body 23 and projecting from the annular upper surface 2 toward the annular lower surface 5; a hollow cylindrical portion 25 formed integrally with the annular lower surface 22 of the lower bearing main body 23 and projecting downward from the annular lower surface 22; an annular outer projecting portion 26 formed integrally with the annular upper surface 2 of the lower bearing main body 23 and disposed radially outwardly of the inner projecting portion 24; and an annular engaging projection 27 formed integrally with the lower bearing main body 23 and the outer projecting portion 26 and projecting radially outwardly from a portion of the annular outer peripheral surface 3 of the lower bearing main body 23 and the annular outer peripheral surface of the outer projecting portion 26.

The lower bearing main body 23 at its portion located radially inwardly of the inner projecting portion 24 is formed so to be thinner-walled than its portion located radially outwardly of the inner projecting portion 24. The inner projecting portion 24 includes a cylindrical inner peripheral surface 41 having a larger diameter than the diameter of the annular inner peripheral surface 21; a cylindrical outer peripheral surface 44 defining an annular recess 43 in cooperation with an inner peripheral surface 42 of the outer projecting portion 26 and the annular upper surface 2; and an annular top surface 46 opposing the annular lower surface 5 with an annular gap 45 therebetween. The hollow cylindrical portion 25 having an annular outer peripheral surface 47 includes an annular inner peripheral surface 48 which is flush with the annular inner peripheral surface 21 The outer projecting portion 26 having the inner peripheral surface 42 includes an annular top surface 50 which is flush with the annular top surface 46 and opposes the annular lower surface 5 with an annular gap 49 therebetween. The annular outer peripheral surface 3 and the annular engaging outer peripheral surface 8 oppose the annular engaging inner peripheral surface 9 with an annular gap 51 therebetween. The annular inner peripheral surfaces 21 and 48 define a through hole 52, and the inner peripheral surface 41 defines a through hole 53 which is concentric with the through hole 52 and is larger in diameter than the through hole 52.

The bearing body 6 includes an upper bearing main body 63 having the annular lower surface 5, the annular upper surface 11, an annular inner peripheral surface 61. and an annular outer peripheral surface 62, as well as an annular projecting portion 64 formed integrally with the annular lower surface 5 of the upper bearing main body 63 and suspended downward from the annular lower surface 5 toward the annular upper surface 2 of the lower bearing main body 23.

The upper bearing main body 63 which is thinner-walled than the lower bearing main body 23 has an annular U-groove 65 on a radially outer peripheral side of the annular upper surface 11. The annular projecting portion 64 has an annular inner peripheral surface 66 which is flush with the annular inner peripheral surface 61 and is larger in diameter than the annular inner peripheral surface 21; an outer peripheral surface 67 which is smaller in diameter than the inner peripheral surface 41 and opposes the inner peripheral surface 41 with the annular gap therebetween; and an annular top surface 69 which opposes the annular top surface 2 with an annular gap 68 therebetween. The annular inner peripheral surfaces 61 and 66 define a through hole 70 which is larger in diameter than the through hole 52 and is smaller in diameter than the through hole 53.

The recess 43 on its radially outer peripheral side communicates with the outside through a labyrinth consisting of the gap 49 and the gap 51, while the recess 43 on its radially inner peripheral side communicates with the through hole 53 through a labyrinth consisting of the gaps 45 and 68.

The disk-shaped thrust sliding bearing piece 7 is disposed in the recess 43 between the inner projecting portion 24 and the outer projecting portion 26 in the radial direction and is radially positioned as its annular inner peripheral surface 75 and its outer peripheral surface 76 are respectively brought into contact with the annular outer surface 44 and inner peripheral surface 42 of the inner projecting portion 24 and the outer projecting portion 26 so as to be relatively rotatable in the R direction. This disk-shaped thrust sliding bearing piece 7 has a flat annular upper surface 77 and lower surface 78 which are respectively brought into contact with the flat annular lower surface 5 and annular upper surface 2 relatively slidably in the R direction, as well as a plurality of radially extending grooves 79 and an annular groove 80 communicating with the plurality of grooves 79, the plurality of grooves 79 and the annular groove 80 being provided in each of the upper surface 77 and the lower surface 78. In the same way as the annular lower surface 5 and the annular upper surface 2, the upper surface 77 and the lower surface 78 extend flatly and perpendicularly to the axis O, and a lubricant such as grease is adapted to be accumulated in the plurality of grooves 79 and the groove 80 in each of the upper surface 77 and the lower surface 78.

The annular upper cover 10 includes a disk-shaped portion 87 having the flat lower surface 14 and an annular flat upper surface 85 both extending perpendicularly to the axis O and an annular inner peripheral surface 86, as well as a hollow cylindrical portion 89 formed integrally with the disk-shaped portion 87 and having a cylindrical outer peripheral surface 88. The upper surface 85 and the outer peripheral surface 88 are continuous to each other through a projecting curved surface 90. The hollow cylindrical portion 89 includes an annular inner peripheral surface 91; a hollow cylindrical inner peripheral surface 93 which is continuous to the annular inner peripheral surface 91 through an annular stepped flat surface 92 and is larger in diameter than the annular inner peripheral surface 91; and the annular engaging inner peripheral surface 9 continuous to the inner peripheral surface 93. The annular inner peripheral surface 86 defines a through hole 94, the stepped flat surface 92 opposes the annular upper surface 11 with an annular gap therebetween on the radially outer side of the U-groove 65, and the inner peripheral surface 93 opposes the annular outer peripheral surface 62 with an annular gap therebetween.

In addition to the annular lower surface 12 and upper surface 13 the annular metal plate 15 includes an annular inner peripheral surface 101 having a smaller diameter r1 than the diameters of the through holes 52, 70, and 94, i.e., a smaller diameter r1 than the diameters of the annular inner peripheral surfaces 21, 48, 61, 66, and 86 of the bearing bodies 4 and 6 and the annular upper cover 10; and an annular outer peripheral surface 102 having a diameter r2 identical to the diameter of the annular inner peripheral surface 91. The annular inner peripheral surface 101 defines a through hole 103 which is smaller in diameter than the through hole 94, while the annular outer peripheral surface 102 is in contact with the annular inner peripheral surface 91 of the annular upper cover 10.

In the above-described thrust sliding bearing 1, the bearing body 4 and the annular upper cover 10 are superposed on and coupled to each other by means of the snap-fit type engagement of the annular engaging inner peripheral surface 9 with respect to the annular engaging outer peripheral surface 8 making use of the flexibility of the synthetic resin, such that the superposed thrust sliding bearing piece 7, the bearing body 6, and annular metal plate 15 are sandwiched therebetween. In the relative rotation of the bearing body 4 with respect to the bearing body 6 about the axis O in the R direction, low-friction sliding between the upper surface 77 of the thrust sliding bearing piece 7 and the annular lower surface 5 of the upper bearing main body 63 or low-friction sliding between the lower surface 78 of the thrust sliding bearing piece 7 and the annular upper surface 2 of the lower bearing main body 23 is caused to take place, thereby allowing the relative rotation of the bearing body 4 with respect to the bearing body 6 about the axis O in the R direction to be effected with extremely low frictional resistance.

Figure 7:
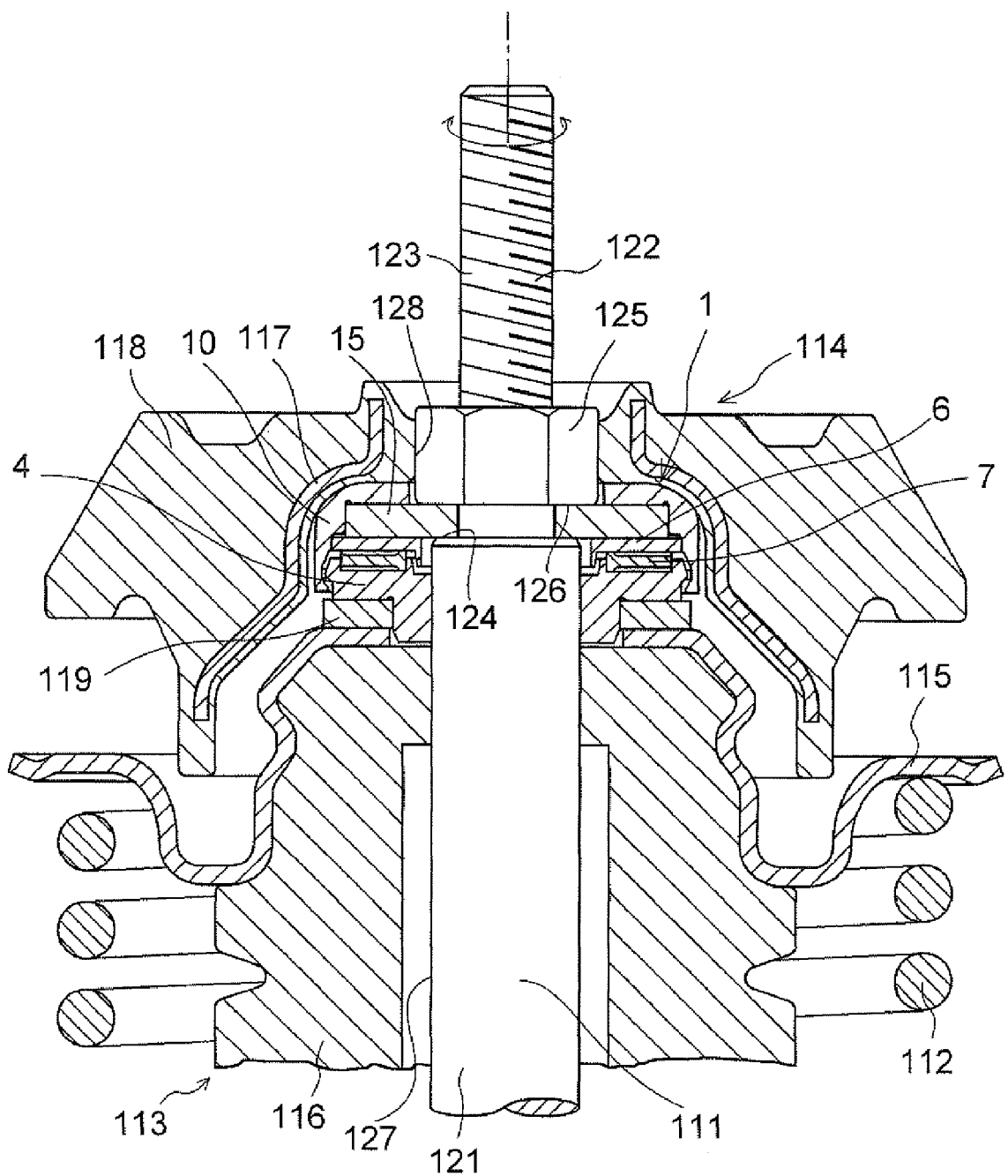
FIG. 7 is a cross-sectional view of an embodiment in which the embodiment shown in FIG. 1 is used in a strut-type suspension.

As shown in FIG. 7, such a thrust sliding bearing 1 is used when a strut-type suspension 113 of a vehicle, which includes a hydraulic shock absorber (not shown) having a piston rod 111 therein and a coil spring 112 disposed so as to surround such a hydraulic shock absorber, is mounted to a vehicle body by means of a mounting mechanism 114.

The strut-type suspension 113 of a vehicle, e.g., a four-wheeled vehicle, includes an upper spring seat member 115 for receiving one end of the coil spring 112 as well as a bump stopper 116 disposed so as to surround the piston rod 111, in addition to the hydraulic shock absorber and the coil spring 112. The mounting mechanism 114 includes a resilient member 118 with a core metal 117 embedded therein, as well as a spacer member 119 interposed between the upper spring seat member 115 and the annular lower surface 22 of the lower bearing main body 23. The thrust sliding bearing 1 is disposed between the resilient member 118 of the mounting mechanism 114 and the upper spring seat member 115 of the strut-type suspension 113 through the spacer member 119. The resilient member 118 enveloping the thrust sliding bearing 1 is disposed in contact with the upper surface 85 and the curved surface 90 of the annular upper cover 10.

The piston rod 111 includes a large-diameter portion 121 disposed in the through holes 52, 53, and 70; a small-diameter portion 122 whose diameter is smaller than the large-diameter portion 121 and which is formed integrally with the large-diameter portion 121 and is disposed in the through holes 94 and 103; and a threaded portion 123 formed on the small-diameter portion 122. The annular metal plate 15 is clamped between an annular recessed stepped surface 124 between the large-diameter portion 121 and the small-diameter portion 122 of the piston rod 111 and an annular surface 126 of a nut 125 threadedly engaged with the threaded portion 123.

The large-diameter portion 121 at its outer peripheral surface 127 in the through hole 52 is in contact with the annular inner peripheral surfaces 21 and 48 rotatably in the R direction, and an annular inner peripheral surface 128 of the resilient member 118 is in contact with the outer peripheral surface of the nut 125. The bearing body 6 and the annular upper cover 10 are held by the resilient member 118 by means of the annular metal plate 15 clamped between the annular recessed stepped surface 124 and the annular surface 126, so as not to rotate in the R direction.

In the above-described combination mechanism of the thrust sliding bearing 1 and the piston rod 111, when the coil spring 112 is rotated about the axis O in the R direction by the steering operation, the bearing body 4 is similarly rotated relatively in the R direction with respect to the bearing body 6. This rotation of the bearing body 4 is effected smoothly by the thrust sliding bearing piece 7 disposed between the bearing body 4 and the bearing body 6, so that the steering operation is performed without resistance.

According to the thrust sliding bearing 1, the annular metal plate 15, which is provided with the annular inner peripheral surface 101 having a smaller diameter than the diameters of the annular inner peripheral surfaces 21, 48, 61, 66, and 86 of the bearing bodies 4 and 6 and the annular upper cover 10, is interposed between the annular upper surface 11 of the bearing body 6 and the lower surface 14 of the annular upper cover 10 such that its lower surface 12 is brought into contact with the annular upper surface 11 of the bearing body 6 and its upper surface 13 is brought into contact with the lower surface 14 of the annular upper cover 10. Therefore, one end of the piston rod 111 can be supported by such an annular metal plate 15, and it is possible to eliminate the mounting plate for supporting one end of the piston rod 111 in the mechanism for mounting the strut assembly to the vehicle body, thereby making it possible to simplify the mounting mechanism and attain cost reduction.

The above-described thrust sliding bearing 1 is an example in which the thrust sliding bearing piece 7 which is separate from the bearing body 4 and the bearing body 6 is provided as the thrust sliding bearing means, but a synthetic resin-made annular thrust sliding bearing portion which is formed integrally with at least one of the annular upper surface 2 of the bearing body 4 and the annular lower surface 5 of the bearing body 6 may alternatively be provided as the thrust sliding bearing means.

The invention claimed is:

1. A thrust sliding bearing comprising:
    a synthetic resin-made annular first bearing body having an annular upper surface and an annular engaging outer peripheral surface;
    a synthetic resin-made annular second bearing body which is superposed on said first bearing body so as to be relatively rotatable about an axis of said first bearing body and has an annular lower surface opposed to the annular upper surface of said first bearing body;
    thrust sliding bearing means interposed between the annular upper surface of said first bearing body and the annular lower surface of said second bearing body and having at least one of a lower surface and an upper surface which is in slidable contact with at least one of the annular upper surface of said first bearing body and the annular lower surface of said second bearing body;
    an annular upper cover having an annular engaging inner peripheral surface engaging the annular engaging outer peripheral surface of said first bearing body; and
    an annular metal plate interposed between an annular upper surface of said second bearing body and a lower surface of said annular upper cover such that a lower surface of said annular metal plate is brought into contact with the annular upper surface of said second bearing body and an upper surface thereof is brought into contact with the lower surface of said annular upper cover, wherein said annular metal plate is provided with an annular inner peripheral surface having a smaller diameter than inside diameters of annular inner peripheral surfaces of said first and second bearing bodies and said annular upper cover.

2. The thrust sliding bearing according to claim 1, wherein said annular upper cover has an annular inner peripheral surface with which an annular outer peripheral surface of said annular metal plate is brought into contact.

3. A combination mechanism of a thrust sliding bearing and a piston rod, comprising the thrust sliding bearing according to claim 1; and a piston rod of a shock absorber, wherein said piston rod includes a large-diameter portion disposed in a through hole defined by the annular inner peripheral surfaces of said first and second bearing bodies; a small-diameter portion whose diameter is smaller than the large-diameter portion and which is formed integrally with the large-diameter portion and is disposed in a through hole defined by the inner peripheral surface of said annular metal plate; and a threaded portion formed on the small-diameter portion, wherein said annular metal plate is clamped between an annular recessed stepped surface between the large-diameter portion and the small-diameter portion of said piston rod and an annular surface of a nut threadedly engaged with the threaded portion.

4. The combination mechanism of a thrust sliding bearing and a piston rod according to claim 3 for use in a strut-type suspension in a four-wheeled vehicle.

* * * * *